United States Patent
Diehl et al.

(10) Patent No.: US 6,317,544 B1
(45) Date of Patent: *Nov. 13, 2001

(54) DISTRIBUTED MOBILE BIOMETRIC IDENTIFICATION SYSTEM WITH A CENTRALIZED SERVER AND MOBILE WORKSTATIONS

(75) Inventors: Jeffrey W. Diehl, Arlington; Mary L. Glaze, Fairfax Station, both of VA (US); Joseph M. Braceland, Washington, DC (US)

(73) Assignee: Raytheon Company, Lexington, MA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/937,956

(22) Filed: Sep. 25, 1997

(51) Int. Cl.[7] .................................................. G06K 9/00
(52) U.S. Cl. .............................. 385/115; 382/116; 283/69; 340/825.34; 356/71
(58) Field of Search .................................... 382/115, 116, 382/117, 118, 119, 127, 313; 340/825.34, 825.31; 361/680, 681, 682, 727; 356/71; 283/69

(56) References Cited

U.S. PATENT DOCUMENTS

| | | | |
|---|---|---|---|
| 4,554,591 | 11/1985 | Kee | 358/256 |
| 4,805,223 | * 2/1989 | Denyer | 382/127 |

(List continued on next page.)

FOREIGN PATENT DOCUMENTS

| | | | | |
|---|---|---|---|---|
| 2142227 | 2/1995 | (CA) | ................ | G06K/9/62 |
| 0 593 386 A | 4/1994 | (EP) | ................ | G06F/1/00 |
| 0 791 899 A | 8/1997 | (EP) | ................ | G07C/9/00 |
| WO 94/22371 | 10/1994 | (WO) | ................ | A61B/5/117 |
| WO/93/10508 | 5/1993 | (WO) | ................ | G06K/9/00 |
| WO/96/18169 | 6/1996 | (WO) | ................ | G06K/9/00 |
| WO 94/10659 | 5/1994 | (WO) | ................ | G07C/9/00 |

OTHER PUBLICATIONS

Lindqvist, Frank H et al., "Combination Radiofrequency identification card– fingerprint identification system" published application for Canadian patent # 2,142,227 ) pp. 1–60, Nov. 1996.*

Henry C. Lee Ph.D. "Advances in fingerprint technology" pp. 212–226, 1994.*

Primary Examiner—Matthew C. Bella
Assistant Examiner—Sheela Chawan
(74) Attorney, Agent, or Firm—Baker Botts L.L.P.

(57) ABSTRACT

A distributed biometric identification system incorporates highly mobile workstations. The system generally includes a plurality of mobile workstations and a file server remotely located from the workstations. The workstations receive input biometric data, such as fingerprint and photographic data, and couples that biometric data to the remote file server. The file server compares the input biometric data with stored biometric data to determine whether any of the stored biometric data matches the input biometric data. The results of the comparison are provided to the workstation that requested the comparison. Workstation mobility is enhanced by providing a wireless and/or PSTN communications link between the workstation and the remotely located file server. Workstation mobility is further improved by housing the workstation in a self-contained, compartmentalized carrying case. Workstation mobility may be even further enhanced by housing the workstation in a so-called lunchbox configuration having a main body, a front panel hinged to the main body, and a back panel hinged to the main body. The front and back panels each have a stowed position adjacent the main body, and a deployed position away from the main body. When the panels are in their stowed positions, the workstation (i.e., main body, front panel, and back panel) is a compact, portable unit.

6 Claims, 6 Drawing Sheets

U.S. PATENT DOCUMENTS

| | | | |
|---|---|---|---|
| 4,843,377 | * 6/1989 | Fuller et al. | 382/118 |
| 4,993,068 | * 2/1991 | Piosenka et al. | 713/186 |
| 5,067,162 | * 11/1991 | Driscoll, Jr. et al. | 382/126 |
| 5,159,546 | * 10/1992 | Inoue et al. | 700/17 |
| 5,191,611 | * 3/1993 | Lang | 705/53 |
| 5,214,574 | * 5/1993 | Chang | 361/680 |
| 5,245,329 | 9/1993 | Gokcebay | 340/825.31 |
| 5,291,560 | 3/1994 | Daugman | 382/2 |
| 5,337,043 | 8/1994 | Gokcebay | 340/825.31 |
| 5,359,669 | * 10/1994 | Shanley et al. | 382/117 |
| 5,386,104 | 1/1995 | Sime | 235/379 |
| 5,420,936 | * 5/1995 | Fitzpatrick | 382/124 |
| 5,457,747 | 10/1995 | Drexler et al. | 380/24 |
| 5,467,403 | 11/1995 | Fishbine et al. | 382/116 |
| 5,485,312 | 1/1996 | Horner et al. | 359/561 |
| 5,513,272 | 4/1996 | Bogosian, Jr. | 382/116 |
| 5,546,943 | 8/1996 | Gould | 128/653.1 |
| 5,566,327 | 10/1996 | Sehr | 395/600 |
| 5,608,387 | * 3/1997 | Davies | 382/118 |
| 5,613,012 | * 3/1997 | Hoffman et al. | 382/115 |
| 5,615,277 | * 3/1997 | Hoffman | 382/115 |
| 5,633,782 | 5/1997 | Goodman et al. | 361/683 |
| 5,664,207 | * 9/1997 | Crumpler et al. | 707/505 |
| 5,764,789 | 6/1998 | Pare, Jr. et al. | 382/115 |
| 5,805,719 | * 9/1998 | Pare, Jr. et al. | 382/115 |
| 5,815,252 | 9/1998 | Price-Francis | 356/71 |
| 5,822,181 | 10/1998 | Jung | 361/683 |
| 5,828,773 | * 10/1998 | Setlak et al. | 382/124 |
| 5,892,838 | * 4/1999 | Brady | 382/115 |
| 5,930,804 | * 7/1999 | Yu et al. | 707/104 |
| 5,959,529 | * 9/1999 | Kail, IV | 340/539 |
| 6,011,537 | * 1/2000 | Slotznick | 345/115 |
| 6,016,476 | * 1/2000 | Maes et al. | 705/1 |
| 6,018,739 | * 1/2000 | McCoy et al. | 707/102 |
| 6,028,950 | * 2/2000 | Merjanian | 382/126 |
| 6,072,891 | * 6/2000 | Hamid et al. | 382/116 |
| 6,154,879 | * 11/2000 | Pare, Jr. et al. | 705/26 |

* cited by examiner

DISTRIBUTED MOBILE BIOMETRIC IDENTIFICATION SYSTEM WITH A CENTRALIZED SERVER AND MOBILE WORKSTATIONS

BACKGROUND OF THE INVENTION (a) Field of the Invention

The present invention relates generally to identification systems. More particularly, it relates to a method and apparatus for identifying individuals based on biometric information such as fingerprints and photographs.

(b) Description of Related Art

In the past, identification of individuals that are processed by the Immigration and Naturalization Service (INS) or other governmental agencies, for example, has been a relatively slow process. Although many governmental agencies maintain large databases containing fingerprints, photographic information and other relevant data pertaining to individuals that use the services of the respective agencies, no known system has been able to quickly search and retrieve information relating to identification and interaction with these individuals. For example, the INS interacts with and is required to identify millions of persons each year, including immigration law violators, immigration benefit applicants, individuals requesting asylum, travelers, and visitors to the United States. Many encounters are processed under severe time constraints and with insufficient access to relevant information.

A co-pending, commonly owned patent application, Ser. No. 08/937,957 filed on Sep. 25, 1997 addresses this problem by providing a distributed biometric identification system and architecture for rapidly identifying individuals using fingerprint and photographic data. The disclosed architecture includes a centralized INS server, a plurality of distributed client workstations that are remotely located from the centralized server, and a wide area telecommunications network interconnecting the client workstations to the server. The centralized server includes a transaction management subsystem, a database for storing fingerprint minutiae of individuals that are of interest to users of the system, a matching controller subsystem coupled between the transaction management subsystem and the database for matching fingerprints of individuals to fingerprints stored in the database, and an image storage and retrieval subsystem for storing and retrieving electronic images of fingerprints and photographic images of individuals.

The above-described system is highly effective in allowing a large number of remotely located users to access, search, compare and retrieve various types of biometric identifying data/information. The present invention is directed to an improvement wherein user location options, user mobility, and overall user access to the distributed biometric system is even further enhanced.

SUMMARY OF THE INVENTION

The present invention may be embodied in a distributed biometric identification system having highly mobile user workstations. More particularly, the invention may be embodied in a distributed, mobile biometric identification system and architecture for rapidly identifying individuals using fingerprint and photographic data. The disclosed architecture includes a centralized server, and a plurality of distributed, mobile client workstations that are remotely located from the centralized server. The mobile workstation includes a substantially portable two-way communications link (e.g., a land-based or satellite-based mobile radiotelephone) that may be used to place the mobile workstation in communication with the centralized server. The centralized server includes a transaction management subsystem, a database for storing fingerprint minutiae of individuals that are of interest to users of the system, a matching controller subsystem coupled between the transaction management subsystem and the database for matching fingerprints of individuals to fingerprints stored in the database, and an image storage and retrieval subsystem for storing and retrieving electronic images of fingerprints and photographic images of individuals.

The above-described mobile workstation is preferably embodied in a substantially portable computing environment having, for example, a portable computer, a portable camera coupled to the computer, a portable fingerprint scanner coupled to the computer, and a substantially portable two-way communications link (e.g., modem) coupled to the computer. Preferably, the communications link includes a land-based or satellite-based mobile radiotelephone.

In one embodiment of the present invention, the portable computer includes a so-called "notebook" or "laptop" computer having for example 32 MB of RAM, an AC power supply, and an AC power cable. Additionally, the portable computer is outfitted with an MRT VideoPort PC card and a Megahertz 33.6 modem/ethernet card. The MRT VideoPort PC card serves as the interface between the portable computer hardware and the fingerprint scanner and the color camera. An MRT video cable is also provided to connect the MRT VideoPort PC card to the fingerprint scanner and the color camera. The Megahertz 33.6 modem/ethernet card provides the portable computer the ability to network to the INS server from local and remote sites. Specifically, networking from local sites can be accomplished through the ethernet functionality of the card. Remote networking can be accomplished through the use of the 33.6 baud modem functionality of the card. Additionally, the required network and telephone cables are also used in the configuration. The portable computer may be configured with Windows 95 operating system software, for example. The portable computer may be further configured with a user-friendly and intuitive graphical user interface using, for example, Microsoft Visual C++ software, and a structured language (SQL) based, client-server, front end query tool. The SQL software is an off the shelf product from Oracle®. The SQL software is the foundation of the Oracle® level of communication within the system. That is, when the system user enters a query the Oracle® component that accepts the query needs to be able to communicate the query over the network to another Oracle® component. The SQL language performs the operation of enabling the query communication between Oracle® components. The portable computer's screen displays menu-driven screens from which users may select specific functions (such as search and enroll, search only, and verify functions) that are to be performed by the system.

In another embodiment of the present invention, the laptop computer, camera, fingerprint scanner and modem are electronically coupled together and conveniently housed in a carrying case. For example, a two-piece, hinged rugged construction carrying case may be outfitted with a foam template having cutouts for holding in place the various components, a power strip for accepting the power cord connections of the various components and providing 12 volt AC power thereto, and a 12 volt DC invertor having a 12 volt extension cord for coupling the strip to an alternative power source, for example, a cigarette lighter of an automobile. The power strip preferably includes surge suppressor circuitry to protect the various components from damage due to power surges.

In still another embodiment of the invention, the above-described portable computer may be housed in a portable, substantially rectangular, self-contained unit known generally as a "lunchbox" CPU. The lunchbox, according to the present invention, includes a main body, a front panel and a back panel. The front and back panels are hinged to the main body such that each may be folded up to a stowed position against the main body, or folded down to a deployed position away from the main body. In general, the main body houses the main computing boards and a display screen, the front panel houses a keyboard, and the back panel houses the camera, the fingerprint scanner and the modem. When in their stowed positions, the front and back panels and the main body combine to form the portable lunchbox. When the front panel is deployed, it exposes the keyboard and the display screen on the main body. When the back panel is deployed, it exposes the camera, fingerprint scanner and modem.

The following describes the procedures that can be followed when using the above-described system in connection with immigration services. When an individual is identified as an undocumented alien, he/she is taken to a mobile workstation. The workstation operator chooses the "search and enroll" feature. The initiation of "search and enroll" brings up a screen that prompts the operator to first place the individual's left index finger on the fingerprint scanner. The screen then prompts the operator to place the individual's right index finger on the fingerprint scanner. Quality analysis is performed on the scanned fingerprint data to make sure that the fingerprint image is of sufficient quality. The screen then turns on the camera and prompts the user to snap a photograph of the individual.

After the picture is taken, the operator is returned to the entry screen for entry of non-biometric data (referred to herein as "biodata"). The user then enters the alien's name, birth date, age and any other information that can be obtained. The workstation associates all entered "biodata" with the current biometric data and with the current request. Upon completion of the biodata screen, a submit button is pressed. The submit button initiates sending the data via modem to the file server located at a remote processing center. A key feature of the invention is that the data is transmitted to the processing center over a widely available communications link such as the public switched telephone network (PSTN), land-based radiotelephone infrastructure, or satellite-based communications.

The processing center takes over and starts processing the input data, freeing the workstation to begin enrolling another individual. A status indicator on the bottom of the workstation screen indicates the status of a particular transaction. The data processing center searches a number of databases, each of which has its own meaning. The databases are referred to generally as "lookout", "recidivists", "asylum", and "benefits". The lookout database contains information on individuals with criminal records on file with the Immigration and Naturalization Services, or who are considered to be "lookouts" posing potential threats to the health and safety of border patrol personnel. The recidivists database contains information on individuals who have attempted to enter the U.S. illegally on multiple occasions. The asylum database contains information on individuals encountered during an asylum application process. The asylum information is checked to detect and reduce immigration fraud. The benefit database is used to verify the identity of individuals encountered during the benefit servicing process to approve or deny applications or petitions for immigration benefits.

The data processing center reports to the workstation the number of hits, if any. The workstation may then call up the biometric data and/or the biodata for each hit in order to review it and make a determination of whether the "hit" is the individual in question.

The present invention may be embodied in a mobile workstation for use in connection with a distributed biometric identification system, said workstation comprising: a portable computer; a biometric data input system coupled to said portable computer; a portable communications terminal coupled to said portable computer; said communications terminal capable of initiating the establishment of a communication link between said workstation and a file server remotely located from said workstation, at least a portion of said communications link comprising a wireless communications link; said biometric data input system capable of receiving input biometric information and providing said input biometric information to said computer; said computer programmed to control said portable communications terminal to begin said initiation of said communication link between said workstation and said file server, and transmit said input biometric information over said communication link to said remote file server.

The present invention may also be embodied in a mobile workstation for use in connection with a distributed biometric identification system, said workstation comprising: a portable computer; a biometric data input system coupled to said portable computer; a portable communications terminal coupled to said portable computer; said communications terminal capable of initiating the establishment of a communication link between said workstation and a file server remotely located from said workstation, at least a portion of said communications link comprising a public switched telephone network (PSTN); said biometric data input system capable of receiving input biometric information and providing said input biometric information to said computer; said computer programmed to control said portable communications terminal to begin said initiation of said communication link between said workstation and said file server, and transmit said input biometric information over said communication link to said remote file server.

In an alternative embodiment of the above-described combination, the portable communications terminal comprises a telephone dialing apparatus; and said initiating comprises dialing a telephone number to establish a telephone line connection with said remotely located file server over said PSTN.

The present invention may be further embodied in a mobile workstation for use in connection with a distributed biometric identification system, said workstation comprising: a portable computer; a fingerprint scanner coupled to said portable computer; a camera coupled to said portable computer; a portable communications terminal coupled to said portable computer; said communications terminal capable of initiating the establishment of a communication link between said workstation and a file server remotely located from said workstation, at least a portion of said communications link comprising a wireless communications link; said fingerprint scanner capable of receiving input fingerprint information and providing said input fingerprint information to said computer; said camera capable of receiving input photographic information and providing said input photographic information to said computer; said computer programmed to control said portable communications terminal to begin said initiation of said communication link between said workstation and said file server, and transmit said input biometric information over said communication link to said remote file server; said computer further programmed to receive from said file server over said communication link stored fingerprint and photographic information stored at said file server that matches said input fingerprint and photographic data transmitted from said workstation to said file server; said computer further programmed to receive from said file server over said communication link information indicating that no stored fingerprint or photographic information at said file server matches said input fingerprint or photographic data transmitted from said workstation to said file server.

The present invention may further be embodied in a mobile workstation for use in connection with a distributed biometric identification system, said workstation comprising: a portable carrying case containing a portable computer, a biometric data input system coupled to said portable computer, a portable communications terminal coupled to said portable computer, and a power strip for coupling power to said computer, biometric data input system, and communications terminal; said communications terminal capable of initiating the establishment of a communication link between said workstation and a file server remotely located from said workstation, at least a portion of said communications link comprising a wireless communications link; said biometric data input system capable of receiving input biometric information and providing said input biometric information to said computer; said computer programmed to control said portable communications terminal to begin said initiation of said communication link between said workstation and said file server, and transmit said input biometric information over said communication link to said remote file server.

The present invention may also be embodied in a method of coupling biometric data to a file server for use in connection with a distributed biometric identification system, the steps comprising: gathering input biometric data at a first location; initiating the establishment of a communication link between said first location and a file server remotely located from said first location, at least a portion of said communications link comprising a wireless communications link; and transmitting said input biometric information over said communication link to said remote file server.

In an alternative embodiment of the present invention, the above described method further comprises the step of receiving at said first location over said communication link stored biometric information that matches said input biometric data transmitted from said first location to said file server.

In another alternative embodiment of the present invention, the above described method further comprises the step of receiving at said first location over said communication link information indicating that no stored biometric information at said file server matches said input biometric data transmitted from said first location to said file server.

In still another alternative embodiment of the present invention, the above-described method further comprises said initiating step comprising dialing a telephone number to establish a telephone line connection with said remotely located file server.

The present invention may also be embodied in a mobile workstation for use in connection with a distributed biometric identification system, said workstation comprising: a portable computer having a main body, a front panel hinged to said main body, and a back panel hinged to said main body; said front panel having a stowed position adjacent said main body and a deployed position away from said main body; said back panel having a stowed position adjacent said main body and a deployed position away from said main body; a biometric data input system coupled to said portable computer and at least partially housed in said back panel; a portable communications terminal coupled to said portable computer and at least partially housed in said back panel; said communications terminal capable of initiating the establishment of a communication link between said workstation and a file server remotely located from said workstation, at least a portion of said communications link comprising a wireless communications link; said biometric data input system capable of receiving input biometric information and providing said input biometric information to said computer; said computer programmed to control said portable communications terminal to begin said initiation of said communication link between said workstation and said file server, and transmit said input biometric information over said communication link to said remote file server.

The invention itself, together with further objects and attendant advantages, will best be understood by reference to the following detailed description, taken in conjunction with the accompanying drawings.

DESCRIPTION OF THE PREFERRED EMBODIMENTS

By way of introduction, a general description of the invention and the disclosed embodiments thereof will now be provided. The present invention may be embodied in a distributed biometric identification system having highly mobile user workstations. More particularly, the invention may be embodied in a distributed, mobile biometric identification system and architecture for rapidly identifying individuals using fingerprint and photographic data. The disclosed architecture includes a centralized server, and a plurality of distributed, mobile client workstations that are remotely located from the centralized server. The mobile workstation includes a substantially portable two-way communications link (e.g., a land-based or satellite-based mobile radiotelephone) that may be used to place the mobile workstation in communication with the centralized server. The centralized server includes a transaction management subsystem, a database for storing fingerprint minutiae of individuals that are of interest to users of the system, a matching controller subsystem coupled between the transaction management subsystem and the database for matching fingerprints of individuals to fingerprints stored in the database, and an image storage and retrieval subsystem for storing and retrieving electronic images of fingerprints and photographic images of individuals.

The above-described mobile workstation is preferably embodied in a substantially portable computing environment having, for example, a portable computer, a portable camera coupled to the computer, a portable fingerprint scanner coupled to the computer, and a substantially portable two-way communications link (e.g., modem) coupled to the computer. Preferably, the communications link includes a land-based or satellite-based mobile radiotelephone.

In one embodiment of the present invention, the portable computer includes a so-called "notebook" or "laptop" computer having for example 32 MB of RAM, an AC power supply, and an AC power cable. Additionally, the portable computer is outfitted with an MRT VideoPort PC card and a Megahertz 33.6 modem/ethernet card. The MRT VideoPort PC card serves as the interface between the portable computer hardware and the fingerprint scanner and the color camera. An MRT video cable is also provided to connect the MRT VideoPort PC card to the fingerprint scanner and the color camera. The Megahertz 33.6 modem/ethernet card provides the portable computer the ability to network to the INS server from local and remote sites. Specifically, networking from local sites can be accomplished through the ethernet functionality of the card. Remote networking can be accomplished through the use of the 33.6 baud modem functionality of the card. Additionally, the required network and telephone cables are also used in the configuration. The portable computer may be configured with Windows 95 operating system software, for example. The portable computer may be further configured with a user-friendly and intuitive graphical user interface using, for example, Microsoft Visual C++ software, and a structured language (SQL) based, client-server, front end query tool. The SQL software is an off the shelf product from Oracle®. The SQL software is the foundation of the Oracle® level of communication within the system. That is, when the system user enters a query the Oracle® component that accepts the query needs to be able to communicate the query over the network to another Oracle® component. The SQL language performs the operation of enabling the query communication between Oracle® components. The portable computer's screen displays menu-driven screens from which users may select specific functions (such as search and enroll, search only, and verify functions) that are to be performed by the system.

In another embodiment of the present invention, the laptop computer, camera, fingerprint scanner and modem are electronically coupled together and conveniently housed in a carrying case. For example, a two-piece, hinged rugged construction carrying case may be outfitted with a foam template having cutouts for holding in place the various components, a power strip for accepting the power cord connections of the various components and providing 12 volt AC power thereto, and a 12 volt DC invertor having a 12 volt extension cord for coupling the strip to an alternative power source, for example, a cigarette lighter of an automobile. The power strip preferably includes surge suppressor circuitry to protect the various components from damage due to power surges.

In still another embodiment of the invention, the above-described portable computer may be housed in a portable, substantially rectangular, self-contained unit known generally as a "lunchbox" CPU. The lunchbox, according to the present invention, includes a main body, a front panel and a back panel. The front and back panels are hinged to the main body such that each may be folded up to a stowed position against the main body, or folded down to a deployed position away from the main body. In general, the main body houses the main computing boards and a display screen, the front panel houses a keyboard, and the back panel houses the camera, the fingerprint scanner and the modem. When in their stowed positions, the front and back panels and the main body combine to form the portable lunchbox. When the front panel is deployed, it exposes the keyboard and the display screen on the main body. When the back panel is deployed, it exposes the camera, fingerprint scanner and modem.

The following describes the procedures that can be followed when using the above-described system in connection with immigration services. When an individual is identified as an undocumented alien, he/she is taken to a mobile workstation. The workstation operator chooses the "search and enroll" feature. The initiation of "search and enroll" brings up a screen that prompts the operator to first place the individual's left index finger on the fingerprint scanner. The screen then prompts the operator to place the individual's right index finger on the fingerprint scanner. Quality analysis is performed on the scanned fingerprint data to make sure that the fingerprint image is of sufficient quality. The screen then turns on the camera and prompts the user to snap a photograph of the individual.

After the picture is taken, the operator is returned to the entry screen for entry of non-biometric data (referred to herein as "biodata"). The user then enters the alien's name, birth date, age and any other information that can be obtained. The workstation associates all entered "biodata" with the current biometric data and with the current request. Upon completion of the biodata screen, a submit button is pressed. The submit button initiates sending the data via modem to the file server located at a remote processing center. A key feature of the invention is that the data is transmitted to the processing center over a widely available communications link such as the public switched telephone network (PSTN), land-based radiotelephone infrastructure, or satellite-based communications.

The processing center takes over and starts processing the input data, freeing the workstation to begin enrolling another individual. A status indicator on the bottom of the workstation screen indicates the status of a particular transaction. The data processing center searches a number of databases, each of which has its own meaning. The databases are referred to generally as "lookout", "recidivists", "asylum", and "benefits". The lookout database contains information on individuals with criminal records on file with the Immigration and Naturalization Services, or who are considered to be "lookouts" posing potential threats to the health and safety of border patrol personnel. The recidivists database contains information on individuals who have attempted to enter the U.S. illegally on multiple occasions. The asylum database contains information on individuals encountered during an asylum application process. The asylum information is checked to detect and reduce immigration fraud. The benefit database is used to verify the identity of individuals encountered during the benefit servicing process to approve or deny applications or petitions for immigration benefits.

The data processing center reports to the workstation the number of hits, if any. The workstation may then call up the biometric data and/or the biodata for each hit in order to review it and make a determination of whether the "hit" is the individual in question.

Figure 1:
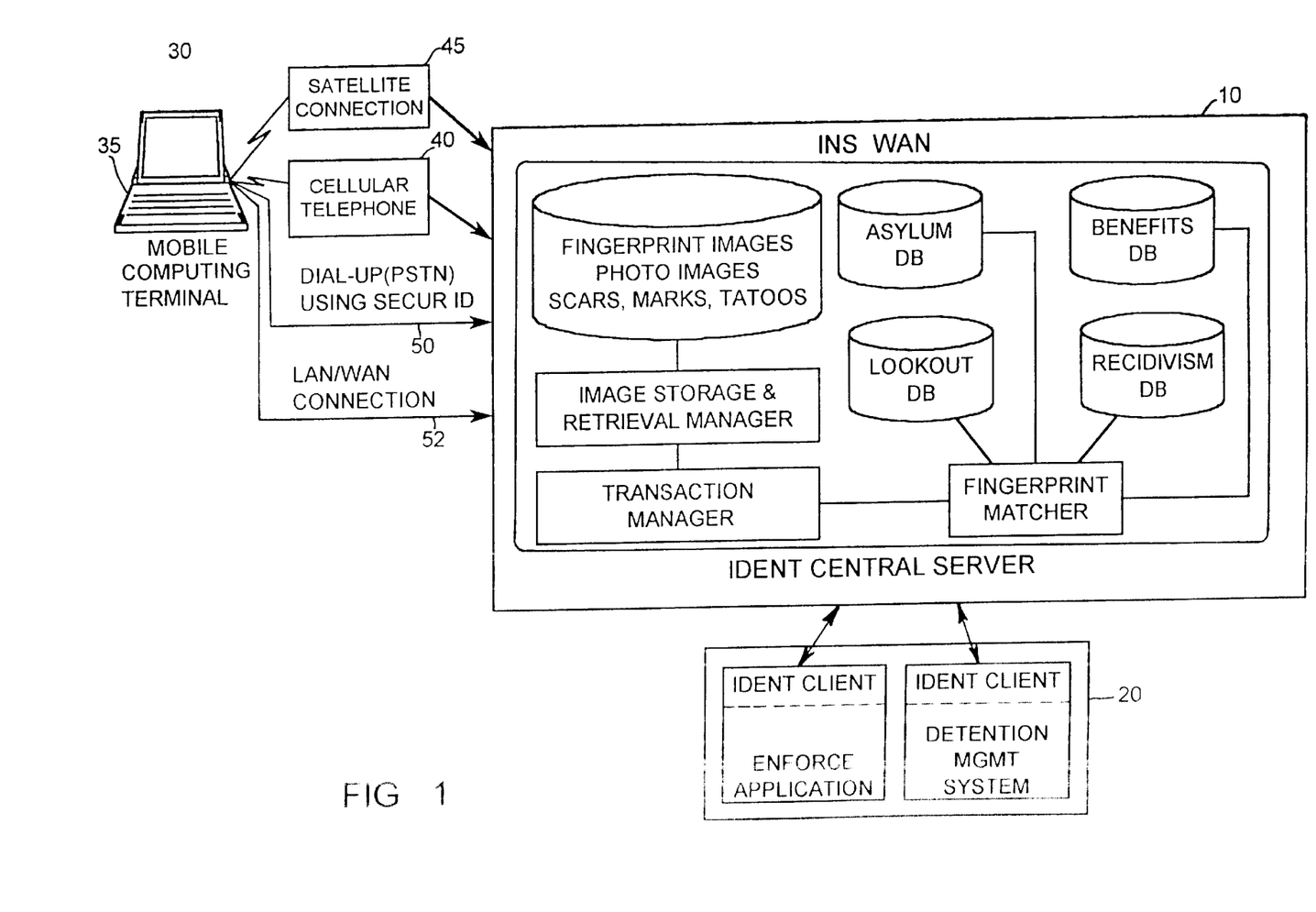
FIG. 1 is a diagram of a distributed biometric identification system having mobile distributed workstations embodying the present invention.

Referring now to FIG. 1, a diagram of a system employing the present invention is shown. The system generally includes a central server 10, a set of software clients 20, and a mobile access station 30.

The central server 10 provides backend functionality for the system. The central server 10 provides a variety of functions including receiving input fingerprint images and photo images, image storage and retrieval management, transaction management, and fingerprint matching functionality, along with databases including "asylum", "lookout", "benefits" and "recidivism". These functions are available for use by the user at a mobile access station 30. Database functions may include but are not limited to the storage and retrieval of biodata such as fingerprints, biographical history, and photographs. The database may also contain information as to whether an individual is dangerous, a repeat immigration offender, or eligible for asylum and benefits. The lookout database contains information on individuals with criminal records on file with the Immigration and Naturalization Services, or who are considered to be "lookouts" posing potential threats to the health and safety of border patrol personnel. The recidivists database contains information on individuals who have attempted to enter the U.S. illegally on multiple occasions. The asylum database contains individuals encountered during an asylum application process. The asylum information is checked to detect and reduce immigration fraud. The benefit database is used to verify the identity of individuals encountered during the benefit servicing process to approve or deny applications or petitions for immigration benefits.

The central server 10 also has access to software clients 20. These software clients 20 allow the system user to begin processing paperwork regarding an apprehended individual before returning to an office to complete processing of the individual. The software clients 20 are accessed from mobile access stations 30 through the central server 10. Traditionally, paperwork on apprehended individuals has been typed on a typewriter and photocopied as necessary. The software clients 20 and the central server 10 allow the system user to enter relevant biodata from the apprehended individual into a database. The biodata may then be accessed and printed as needed by all authorized users of the central server 10. Software clients 20 may include detention facility information, such as the location of a prisoner within the prison system; and immigrant benefits and asylum information.

The mobile access station 30 shown in FIG. 1 includes a mobile computing terminal 35, and remote access components such as a radiotelephone 40, a satellite connection 45, and a landline connection 50, as well as appropriate hardware for connecting to the above-noted remote access components and other input and output devices. Hardware for gaining remote access may include a modem or some other communication-type card that may be interfaced with the mobile computing terminal 35. Remote access components provide the system user a communication path between the mobile computing terminal 35 and the central server 10.

Figure 2:
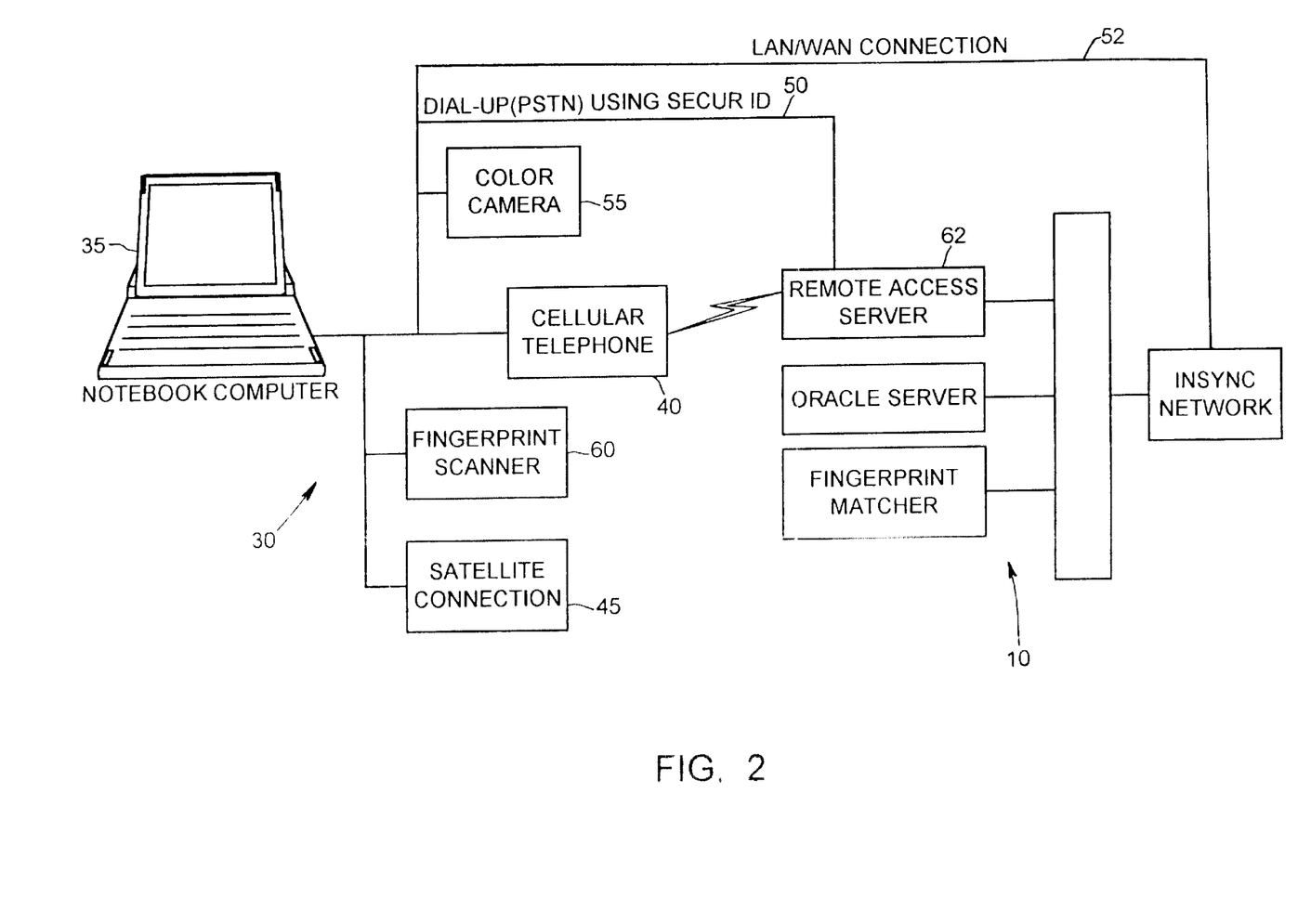
FIG. 2 is a hardware-based diagram of the mobile distributed workstation shown in FIG. 1, wherein the portable computer of the mobile workstation includes a laptop or notebook computer.

A more detailed illustration of the mobile access station 30 and its associated components are shown in FIG. 2. As illustrated, the mobile access station 30 includes a mobile computing terminal 35, a radiotelephone 40, a satellite connection 45, a land line connection 50, a color camera 55, and a fingerprint scanner 60. The mobile computing terminal 35 may be embodied in a portable notebook/laptop computer operating on the Windows 95® environment. The mobile computing terminal 35 gains access to the central server 10 via one of four paths including: the radiotelephone 40, the satellite connection 45, the land line connection 50, or direct connection to the LAN/WAN 52. The use of a radiotelephone 40 to establish communication preferably includes the use of a three-Watt cellular telephone known in the art as a "bag phone". The use of a bag radiotelephone provides a better data path to the remote access server 65 than a low power "hand-held" radiotelephone. When the mobile computing terminal 35 establishes communication to the central server 10, it is does so through an access server 62. The access server 62 performs the function of verifying the identity of the entity who is attempting to gain access to the central server 10. In addition to the aforementioned communication devices, the mobile access station 30 includes a color camera 55 and a fingerprint scanner 60. The color camera 55 and a fingerprint scanner 60 are used to gather biometric data from the individual in question. The color camera 55 may be a digital camera or any other device suitable for obtaining digital images of apprehended individuals. The fingerprint scanner 60 is provided for obtaining digital images of the individual's fingerprints, digital fingerprint scanners are well known in the art. The color camera 55 and the fingerprint scanner 60 are interfaced to the mobile computing terminal 35 via a video capture card, which is known in the art.

Figure 3:
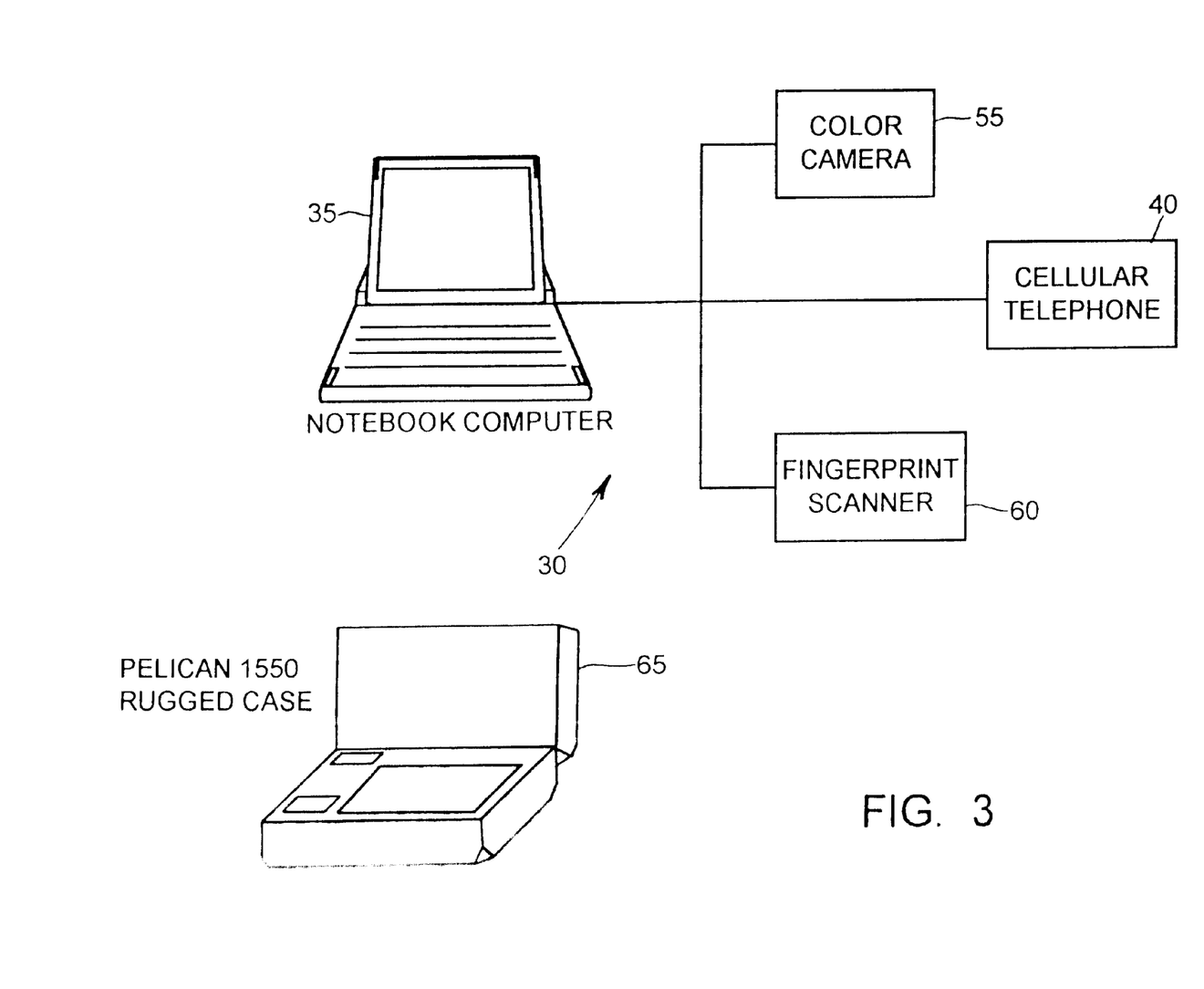
FIG. 3 is a more detailed diagram of the mobile workstation shown in FIG. 2, wherein the workstation incorporated a portable case.

In an alternative embodiment, a two-piece rugged construction case 65 (see FIG. 3) may be used to house the mobile computing terminal 35, the radiotelephone 40, the color camera 55, and the fingerprint scanner 60. The portable case 65 provides component protection from shock and water damage. Additionally, the portable case 65 eliminates the need for field personnel to connect the various components of the mobile access station 30 together each time the system is to be used. Rather the portable case embodiment encases the connected hardware and creates one self-contained unit providing a power connection by which to power the unit. The power connection may be a 120 VAC connection. Alternatively, a power connection may be adapted to receive 12 VDC input from an automobile cigarette lighter. The case may be outfitted with a foam template having cutouts for holding in place the various components, a power strip for accepting the power cord connections of the various components and providing 12 volt AC power thereto, and a 12 volt DC invertor having a 12 volt extension cord for coupling the strip to an alternative power source, for example, a cigarette lighter of an automobile. The power strip preferably includes surge suppressor circuitry to protect the various components from damage due to power surges.

Figure 4:
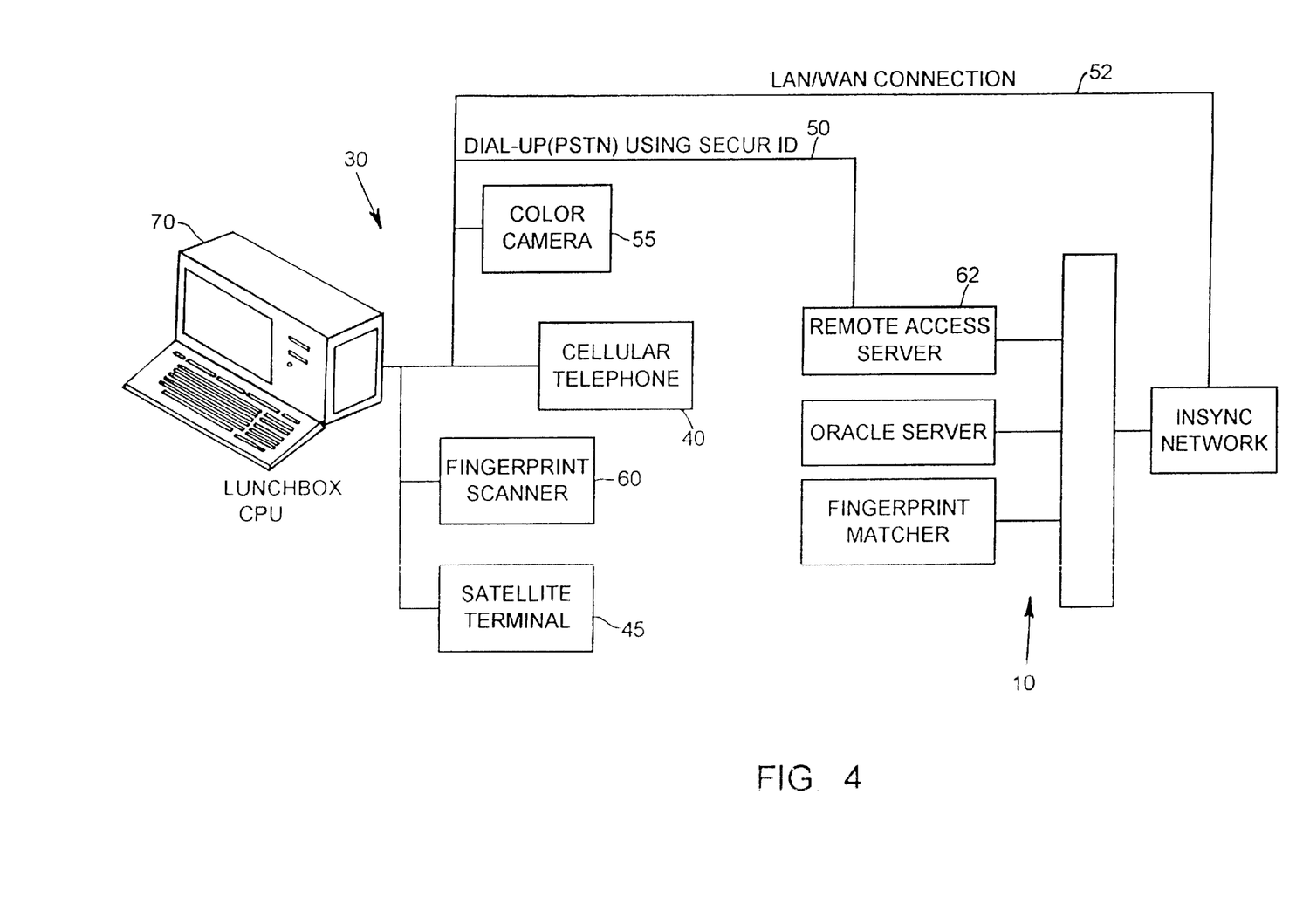
FIG. 4 is a hardware-based diagram of the mobile distributed workstation shown in FIG. 1, wherein the mobile workstation is housed in a lunchbox configuration.

FIG. 4 illustrates another embodiment of the mobile access station 30 of the present invention. This alternate embodiment varies from the previous embodiment in that the mobile computing terminal is housed on a so-called "lunchbox" configuration 70. The lunchbox 70 is a self contained processing unit and carrying case. The processing unit and operating system of the lunchbox 70 are identical to that of the mobile computing terminal 35. The lunchbox 70 is capable of accepting a number of different computer cards, which perform the function of interfacing to the radiotelephone 40, the color camera 55, the fingerprint scanner 60, the satellite connection 45, and the land line connection 50. Additionally, the lunchbox 70 configuration houses the radiotelephone 40, the color camera 55, and the fingerprint scanner 60 in a manner similar to the portable case 65.

The lunchbox 70 configuration offers the advantages of being lightweight, small, low cost, self contained, and easy to maintain. Another distinct advantage is the addition of a bright screen that can be read in bright daylight, as opposed to a conventional laptop LCD screen that is difficult to read in bright sunshine. Similar to the portable case 65 configuration, the only external component to the lunchbox 70 is a power cord. Power may be provided either using 120 VAC or 12 VDC.

Figure 5:
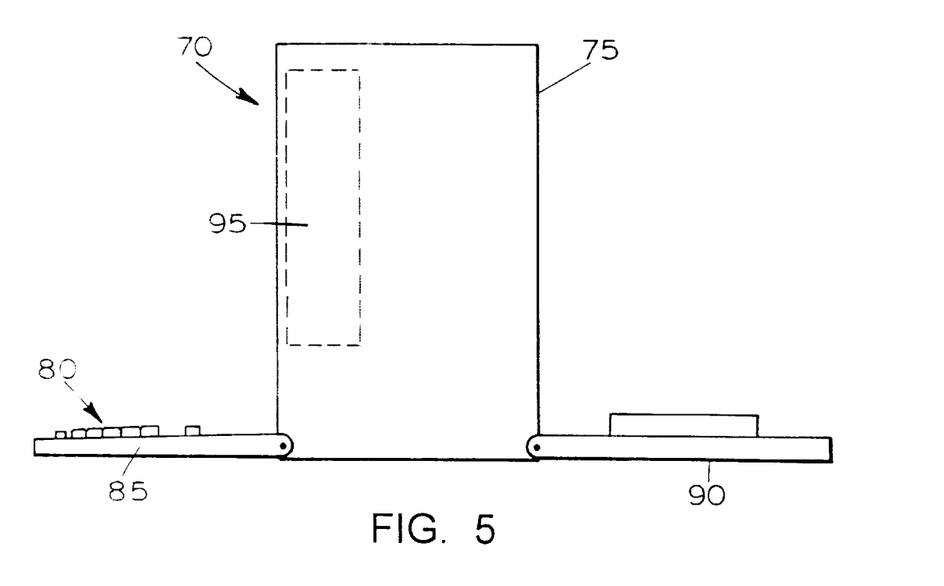
FIGS. 5 and 6 further illustrate the lunchbox configuration shown in FIG. 4.
Figure 6:
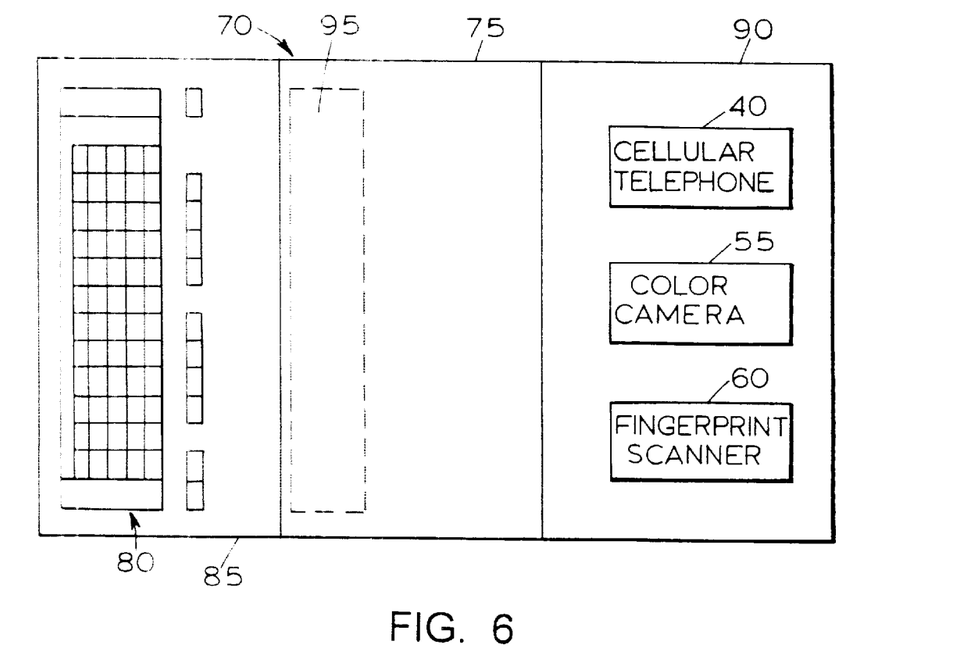

Side and plan views of the lunchbox 70 configuration can be seen in FIGS. 5 and 6. The lunchbox 70 configuration includes a main housing 75, a keyboard 80, a foldable front panel 85, a foldable back panel 90, a display screen 95, and a processing unit (not shown) and associated interface cards (not shown) for accessing the radiotelephone 40, the color camera 55, and the fingerprint scanner 60.

The front panel 85 folds down from an upright and locked position that covers the display screen 95 to a downward position which reveals the keyboard 80. Likewise, the back panel 90 folds down to permit user access to the radiotelephone 40, the color camera 55, and the fingerprint scanner 60. A major advantage to this particular feature is the fact that when the both the front and back panels 85, 90 are closed and locked against the main housing 75 the keyboard 80, the display screen 95, and other associated components 40, 55, and 60 are protected from damage.

Figure 7:
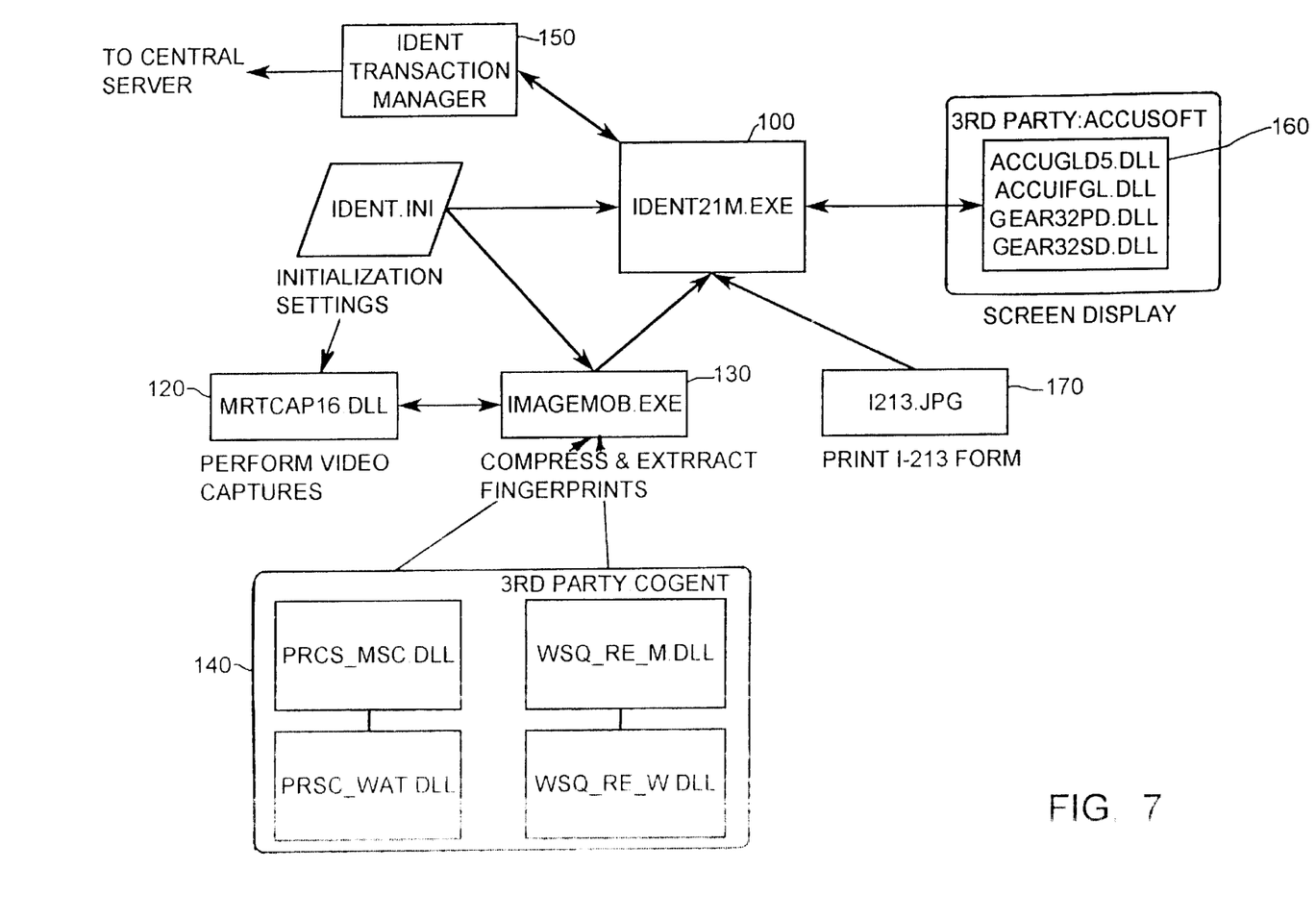
FIG. 7 is a diagram illustrating the software operations that perform the biometric identification functions of the portable computers shown in FIGS. 1–6.

FIG. 7 illustrates the software operations performed by the mobile workstation 30. As shown in FIG. 7, the ident21m.exe file 100 is an executable file that is used on the mobile biometric identification system. The ident21m.exe file 100 is the file that controls the functions of the mobile terminal 30. The ident.ini file 110 holds initialization information that is used to initialize the ident21m.exe file 100, the mrtcap16.dll file 120, and imagemob.exe file 130. The ident.ini file 110 contains information pertaining to the hardware that is interfaced to the various software functions. For example, if a new fingerprint scanner is used, the ident.ini file 110 is the only file that must be changed to accommodate the hardware change.

The mrtcap16.dll file 120 performs the function of controlling video captures in the system. Specifically, the mrtcap16.dll file 120 controls the fingerprint scanner 60 and the color camera 55. After digital images are captured by the mrtcap16.dll file 120, they are passed to the imagemob.exe file 130, which performs the function of compressing and extracting digital images. The imagemob.exe file 130 makes software calls to a commercially available software package 140 known commercially under the tradename Cogent 140. The Cogent software 140 performs the processing of the images received by the imagemod.exe file 130.

The ident21m.exe file 100 is interfaced to a transaction manager 150 which is located at a remote site. The transaction manager 150 performs the function of receiving the image and biodata, as well as providing a software pathway from the ident21m.exe file 100 to the central server 10, which is also located at a remote site. Additionally, the ident21m.exe file 100 controls the on-screen display. On-screen display software 160 (available from Accusoft) is used to create various gray-scale on-screen displays. The Accusoft 160 software also provides various display utilities that aid in processing on-screen graphics. The i213.jpg file 170 is a graphics file that is printed when needed. Typically the i213.jpg file 170 is a form that is required when processing an apprehended individual.

When an individual is apprehended, the system user selects an icon from the on-screen display, which preferably represents a Windows 95 environment. The icons represent the method of interface to the central server 10. After the network connection is established, the system user is prompted to enter verification. Upon completion of verification, the system user may elect to enroll the apprehended individual into the database located at the central server 10. After selecting the enroll option, the ident.ini file 110 initializes all relevant files. As enrollment continues, the mrtcap16.dll file 120 performs the function of controlling the color camera and fingerprint scanner in a manner to obtain necessary information from the individual. The video images are compressed by the software 140 under the control of the imagemob.exe file 130. The information is then transferred to the transaction manager 150 via the ident21m.exe file 100 over the established communication link. The transaction manager 150 forwards the information to the central server 10. Queries as to the history of the apprehended individual are also forwarded to the central server 10 in a similar fashion. Information regarding the history of the individual is returned to the ident21m.exe file 100 via the ident transaction manager 150. The received information is transferred to the screen display using the on-screen display software 160.

The mobile workstation 30 described herein is preferably embodied in a substantially portable computing environment having, for example, a portable (e.g., a laptop or notebook) computer, a substantially portable camera coupled to the computer, a substantially portable fingerprint scanner coupled to the computer, and a substantially portable communications link coupled to the computer and preferably taking the form of a modem embodied in a land-based or satellite-based mobile radiotelephone.

The portable computer described herein preferably includes, for example, 32 MB of RAM, an AC power supply, and an AC power cable. Additionally, the portable computer is outfitted with an MRT VideoPort PC card and a Megahertz 33.6 modem/ethernet card. The MRT VideoPort PC card serves as the interface between the portable computer hardware and the fingerprint scanner and the color camera. An MRT video cable is also provided to connect the MRT VideoPort PC card to the fingerprint scanner and the color camera. The Megahertz 33.6 modem/ethernet card provides the portable computer the ability to network to the INS server from local and remote sites. Specifically, networking from local sites can be accomplished through the ethernet functionality of the card. Remote networking can be accomplished through the use of the 33.6 baud modem functionality of the card. Additionally, the required network and telephone cables are also used in the configuration. The portable computer may be configured with Windows 95 operating system software, for example. The portable computer may be further configured with a user-friendly and intuitive graphical user interface using, for example, Microsoft Visual C++ software, and a structured language (SQL) based, client-server, front end query tool. The SQL software is an off the shelf product from Oracle®. The SQL software is the foundation of the Oracle® level of communication within the system. That is, when the system user enters a query the Oracle® component that accepts the query needs to be able to communicate the query over the network to another Oracle® component. The SQL language performs the operation of enabling the query communication between Oracle® components. The portable computer's screen displays menu-driven screens from which users may select specific functions (such as search and enroll, search only, and verify functions) that are to be performed by the system.

Of course, it should be understood that a range of changes and modifications can be made to the preferred embodiment described above. For example, the present invention is described in connection with a particular hardware and processing structure for transmitting and receiving live biometric data. However, a wide variety of transmitting and receiving structures could be utilized as long as the essential mobile distributed workstation features described herein are present. It is therefore intended that the foregoing detailed description be regarded as illustrative rather than limiting and that it be understood that it is the following claims, including all equivalents, which are intended to define the scope of this invention.

What is claimed is:

1. A distributed biometric enrolling and identification system for enrolling and identification of individuals by a user of a stand-alone workstation, the enrolling and identification system comprising a centralized server having a plurality of databases each having a defined meaning related to the individuals to be enrolled or identified and one or more stand-alone workstations in communication with the centralized server, wherein one or more of said stand-alone workstations comprise:

a portable computer;

a biometric data input system coupled to said portable computer and receiving biometric data of an individual to be enrolled or identified for transfer to said portable computer;

a user input terminal for enabling a user to input to the portable computer non-biometric data (biodata);

a portable communications terminal coupled to said portable computer;

said communications terminal initiating establishment of a communication link between said workstation and the centralized server remotely located from said workstation, at least a portion of said communications link comprising a wireless communications link, to transmit biometric data and biodata to the centralized server; and said portable computer programmed to:

control said portable communications terminal to establish a communication link between the workstation and the centralized server;

activate transmission of biometric data and biodata of an individual to be enrolled or identified by means of the established communication link to the remote centralized server;

receive from the centralized server by means of the established communication link identification of the plurality of databases containing biodata and/or biometric data stored at the centralized server matching or closely matching biometric data of an individual to be enrolled or identified received at the biometric data input system;

activate a display of said portable computer to present menus for a user to select specific functions based on the identified databases including search for and enroll an individual, search only for an individual for identification, and verify the enrollment of an individual; and activate the display based on the selected specific function to present to a user the identified databases for evaluation of an individual for enrollment, verification of enrollment, or identification from the identified databases having a defined meaning related to the received biodata and/or biometric data for an individual.

2. The workstation of claim 1 further comprising said computer programmed to initiate said communications terminal to receive from the centralized server over said communication link biometric information stored at said centralized server that matches or closely matches the input biometric data transmitted from said workstation to the centralized server.

3. The workstation of claim 1 further comprising said computer programmed to initiate said communications terminal to receive from the centralized server over said communication link information indicating that no stored biometric information at the centralized server matches or closely matches the input biometric data transmitted from said workstation to the centralized server.

4. The workstation of claim 1 wherein:

the input biometric data comprises input fingerprint data;

the stored biometric data comprises stored fingerprint data; and said computer comprises programming to initiate said communications terminal to receive from the centralized server over the communication link stored fingerprint information matching or closely matching the input fingerprint data transmitted to the centralized server from said workstation.

5. The workstation of claim 1 wherein:

the input biometric data comprises input photographic data;

the stored biometric data comprises stored photographic data; and said computer programmed to initiate said communications terminal to receive from the centralized server over the communication link stored photographic information matching or closely matching the input photographic data transmitted to the centralized server from said workstation.

6. A distributed biometric enrolling and identification system for enrolling and identification of individuals by a user of a stand-alone workstation, the enrolling and identification system comprising a centralized server having a plurality of databases each having a defined meaning related to the individuals to be enrolled or identified and one or more stand-alone workstations in communication with the centralized server, wherein one or more of said stand-alone workstations comprise:

a portable computer;

a fingerprint scanner coupled to said portable computer, said fingerprint scanner receiving input fingerprint information of an individual to be enrolled or identified and providing said input fingerprint information to said computer;

a camera coupled to said portable computer, said camera receiving input photographic information of an individual to be enrolled or identified and providing said input photographic information to said computer;

a user input terminal for enabling a user to input to the portable computer non-biometric data (biodata) of an individual to be enrolled or identified;

a portable communications terminal coupled to said portable computer;

said communications terminal initiating the establishment of a communication link between said workstation and the centralized server remotely located from said workstation, at least a portion of said communications link comprising a wireless communications link;

said portable computer programmed to:

control said portable communications terminal to establish a communication link between the workstation and the centralized server;

activate transmission of biometric data and biodata of an individual to be enrolled or identified by means of the established communication link to the remote centralized server;

receive from the centralized server by means of the established communication link identification of the plurality of databases containing biodata and/or biometric data stored at the centralized server matching or closely matching biometric data of an individual to be enrolled or identified received at the fingerprint scanner or the camera;

activate a display of said portable computer to present menus for a user to select specific functions based on the identified databases including search for and enroll an individual, search only for an individual to be identified, and verify the enrollment of an individual; and activate the display based on the selected specific function to present to the user one or more identified databases for evaluation of an individual for enrollment, verification of enrollment, or identification from the one or more identified databases having a defined meaning related to the received biodata and/or biometric data for an individual.

* * * * *